(12) United States Patent
Maikawa (10) Patent No.: US 10,304,617 B2
(45) Date of Patent: May 28, 2019

(54) COIL UNIT FOR CONTACTLESS POWER TRANSMISSION

(71) Applicant: NISSAN MOTOR CO., LTD., Yokohama-shi, Kanagawa (JP)

(72) Inventor: Kengo Maikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/564,800

(22) PCT Filed: Apr. 8, 2015

(86) PCT No.: PCT/JP2015/060923
§ 371 (c)(1),
(2) Date: Oct. 6, 2017

(87) PCT Pub. No.: WO2016/162965
PCT Pub. Date: Oct. 13, 2016

(65) Prior Publication Data
US 2018/0114629 A1 Apr. 26, 2018

(51) Int. Cl.
| H01F 5/00 | (2006.01) |
| H01F 27/28 | (2006.01) |
| B60L 5/00 | (2006.01) |
| H01F 38/14 | (2006.01) |
| B60L 11/18 | (2006.01) |
| H01F 27/24 | (2006.01) |

(52) U.S. Cl.
CPC ............ *H01F 27/2876* (2013.01); *B60L 5/00* (2013.01); *B60L 11/182* (2013.01); *H01F 27/24* (2013.01); *H01F 27/2823* (2013.01); *H01F 38/14* (2013.01); *Y02T 10/7005* (2013.01)

(58) Field of Classification Search
CPC ...................... H01F 5/00; H01F 27/00–27/36
USPC ............................ 336/65, 83, 200, 232–234
See application file for complete search history.

(56) References Cited

U.S. PATENT DOCUMENTS 9,406,429 B2 8/2016 Abe et al.
2008/0197956 A1 8/2008 Hasegawa et al.

FOREIGN PATENT DOCUMENTS

| EP | 2 172 952 A1 | 4/2010 |
| JP | 2006-129605 A | 5/2006 |
| JP | 2008-235860 A | 10/2008 |
| JP | 2009-5472 A | 1/2009 |
| JP | 2013-5523 A | 1/2013 |
| JP | 2014-11853 A | 1/2014 |
| WO | WO 2013/183665 A1 | 12/2013 |
| WO | WO-2014/148312 A1 | 9/2014 |

*Primary Examiner* — Tuyen T Nguyen
(74) *Attorney, Agent, or Firm* — Foley & Lardner LLP (57) ABSTRACT

A coil unit for contactless power transmission includes a non-circular flat coil; a core member made of a magnetic material; and a thermal conductor that has a higher thermal conductivity than the core member. The coil has a corner section and a non-corner section in a coil axial direction view, and the core member and the thermal conductor are disposed to face the non-corner section and the corner section, respectively in a coil axial direction.

5 Claims, 5 Drawing Sheets

COIL UNIT FOR CONTACTLESS POWER TRANSMISSION

TECHNICAL FIELD

The present invention relates to a coil unit for contactless power transmission.

BACKGROUND ART

International Publication No. WO2013/183665 discloses a contactless power supply transformer that includes a pair of magnetic pole portions, and an inter-magnetic-pole core portion provided between the pair of magnetic pole portions. The inter-magnetic-pole core portion is formed by alternately disposing a ferrite member and a thermal conductor. Heat generated due to iron loss of the inter-magnetic-pole core portion can be dissipated to the outside through the thermal conductors.

SUMMARY OF INVENTION

Technical Problem

However, in the above-mentioned conventional technology, the thermal conductor is made of aluminum, and thus the amount of magnetic flux linkage with a coil decreases, and the electromagnetic performance (such as the inductance, and the coupling coefficient) of the coil may be degraded, as compared with the case where the entire inter-magnetic-pole core portion is made of a ferrite member.

The present invention has been made in view of the above-mentioned problem, and an object of the present invention is to improve the heat dissipation performance of the coil while suppressing degradation of the electromagnetic performance of the coil.

Solution to Problem

An aspect of the present invention provides a coil unit for contactless power transmission includes a non-circular flat coil; a core member made of a magnetic material; and a thermal conductor that has a higher thermal conductivity than the core member. The coil has a corner section and a non-corner section in a coil axial direction view, and the core member and the thermal conductor are disposed to face the non-corner section and the corner section, respectively in a coil axial direction.

Advantageous Effects of Invention

During a contactless power receiving or power supply operation, in a vicinity area of a flat coil in a coil axial direction, an area with a low magnetic flux density is more likely to occur in a portion corresponding to a corner section (hereinafter a corner section vicinity area) than in a portion corresponding to a non-corner section (hereinafter a non-corner section vicinity area). In the above-mentioned coil unit, a thermal conductor is disposed to face the corner section of the coil, and thus the thermal conductor can be in close proximity to the coil while suppressing the effect on the amount of magnetic flux passing through the core member. Since the thermal conductor has a higher thermal conductivity than the core member, the heat of the coil can be introduced to the outside efficiently. Thus, the heat dissipation performance of the coil unit can be improved while suppressing degradation of the electromagnetic performance of the coil.

DESCRIPTION OF EMBODIMENTS

Hereinafter, embodiments of the present invention will be described with reference to the drawings.

First Embodiment

A coil unit U1 for contactless power supply according to a first embodiment of the present invention is a device that supplies power in a contactless manner to an electric vehicle stopped at a predetermined position. When high-frequency power is supplied from a power supply unit, the coil unit U1 supplies power to an in-vehicle battery or the like via a coil unit for power reception mounted in an electric vehicle.

Figure 1:
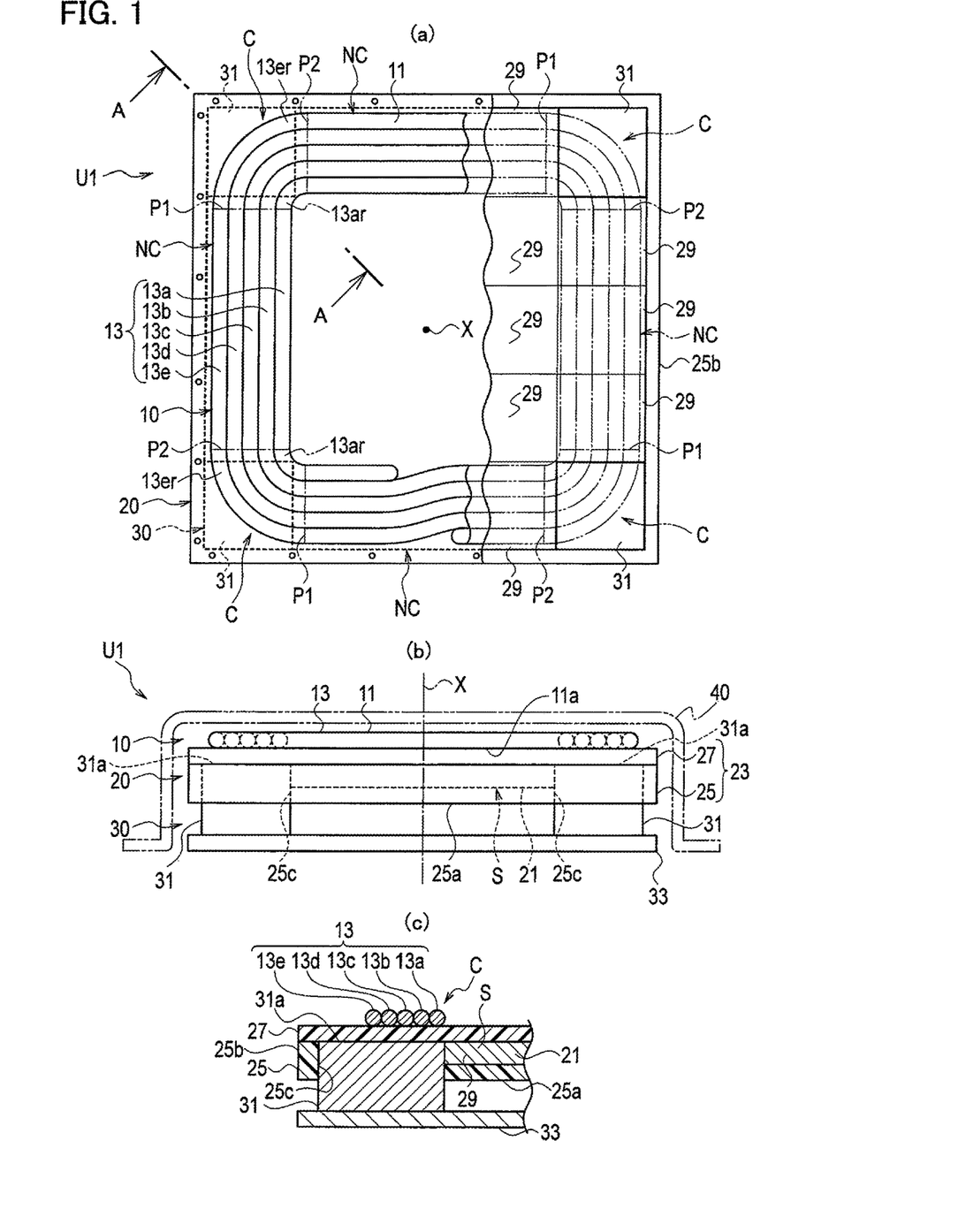
FIG. 1 is a diagram illustrating the structure of a coil unit for contactless power supply according to a first embodiment of the present invention, (a) is a plan view, (b) is a side view, and (c) is a sectional view taken along line A-A in (a).

As illustrated in (a), (b) of FIG. 1, the coil unit U1 includes a coil section 10 having a coil axis X approximately parallel to a vertical direction, a core section 20 that supports the coil section 10, and a support section 30 that supports the coil section 10 and the core section 20 on the ground. The entire coil unit U1 is covered with a unit cover 40 installed in the ground.

The coil section 10 includes a flat coil 11 having a thickness in the coil axial direction. The coil 11 is approximately plate-shaped as a whole, and has a major surface 11a perpendicular to the coil axis X.

A winding wire 13 of the coil 11 is a litz wire wound in a rectangular spiral form in a coil axial direction view, and occupies an approximately rectangular annular area in a coil axial direction view. The coil 11 has 4 corner sections C corresponding to the corners of the rectangular annular area, and 4 non-corner sections NC corresponding to the sides of the rectangular annular area.

Each of the corner sections C includes a portion (hereinafter, a local maximum curvature section) 13ar that has a local maximum curvature in a coil axial direction view, out of the innermost circumferential winding wire 13a, and a portion positioned between one side boundary surface P1 and the other side boundary surface P2 outwardly of the local maximum curvature section 13ar out of winding wires 13b to 13e other than the innermost circumferential winding wire 13a. Here, the local maximum curvature section 13ar of the innermost circumferential winding wire 13a is a portion of the winding wire 13a, having a curvature greater than the average value (hereinafter the curvature average value) of the curvature of the circumference of the winding wire 13a. The one side boundary surface P1 is a virtual plane surface that passes through one end of the local maximum curvature section 13ar and is perpendicular to the extension direction of the winding wire 13a at the end, and the other side boundary surface P2 is a virtual plane surface that passes through the other end of the local maximum curvature section 13ar and is perpendicular to the extension direction of the winding wire 13a at the other end. The corner sections C in this embodiment also include a local maximum curvature section 13er of the outermost circumferential winding wire 13e.

In contrast, non-corner sections NC are the portions other than the corner sections C. Therefore, the curvature of the innermost circumferential winding wire 13a everywhere forming each non-corner section NC is less than or equal to the above-mentioned curvature average value. In this embodiment, each non-corner section NC is an approximately linear portion that is interposed between adjacent corner sections C.

As illustrated in (a) to (c) of FIG. 1, the core section 20 is provided downwardly (one side in the coil axial direction) of the coil section 10, approximately parallel to the major surface 11a of the coil 11. The core section 20 has an approximately rectangular plate-like shape having a thickness in the coil axial direction, and the 4 sides are approximately parallel to respective extending directions of the non-corner sections NC of the coil 11 in a coil axial direction view.

The core section 20 includes a ferrite core 21 (a magnetic material core member), and a core case 23 that houses the ferrite core 21. The ferrite core 21 forms a magnetic material layer parallel to the major surface 11a of the coil 11. The coil 11 is supported by the upper surface of the core case 23.

The core case 23 includes a resin tray 25 having an approximately rectangular outer shape in a coil axial direction view, and an approximately rectangular plate-shaped resin lid 27 that covers an upper opening of the tray 25. The tray 25 includes an approximately rectangular plate-shaped bottom plate 25a, and a circumferential wall section 25b provided perpendicularly to the circumferential edge of the bottom plate 25a. The circumferential edge of the lid 27 is fastened to the circumferential wall section 25b of the tray 25 by a non-magnetic material fastening tool or the like. The upper surface of the lid 27 is in contact with the winding wire 13 of the coil 11, and a housing space S for housing the ferrite core 21 is formed between the tray 25 and the lid 27. The bottom plate 25a of the tray 25 is provided with openings 25c at four corners corresponding to the corner sections C of the coil 11, and an upper end 31a of a later-described support member 31 is inserted in each of the openings 25c.

The ferrite core 21 includes multiple ferrite tiles 29 (magnetic material core members) with which the above-mentioned housing space S is covered. Each ferrite tile 29 has a rectangular parallelepiped shape with the approximately square bottom surface. It is to be noted that some ferrite tiles 29 positioned inwardly of the innermost circumferential winding wire 13a in a coil axial direction view may be thinned as needed according to a capacity required for the coil unit U1.

In this embodiment, the multiple ferrite tiles 29 are disposed to be positioned immediately below one the winding wires 13a to 13e (to be overlapped with the winding wires 13a to 13e in projection in a coil axial direction) that form at least the non-corner sections NC of the coil 11.

Specifically, the upper surface of the ferrite core 21 is at a position facing the non-corner sections NC of the coil 11 in a coil axial direction with the lid 27 of the core case 23 interposed therebetween.

As illustrated in (a) to (c) of FIG. 1, the support section 30 is provided below the coil section 10, and supports the coil section 10 and the core section 20. The support section 30 consists of aluminum support members 31 (thermal conductors) provided at four corners of the core section 20, and a base plate 33 connected to the lower end of the support members 31 in a heat transferable manner. The base plate 33 is made of, for instance, metal such as aluminum, and is fastened to the ground by a fastening member such as an anchor bolt.

Each of the support members 31 has a prism-like shape, and the upper end (heat input section of thermal conductor) 31a is inserted in an opening 25c of the tray 25 of the core case 23. Thus, the ferrite core 21 that forms a magnetic material layer and the upper ends 31a of the support member 31 are disposed in the same layer in close proximity to each other in the extending direction of the magnetic material layer. In other words, the ferrite core 21 at the positions corresponding to the corner sections C of the coil 11 is replaced by the support members 31.

The upper ends 31a of the support members 31 are at positions facing the corner sections C of the coil 11 in a coil axial direction with the lid 27 of the core case 23 interposed therebetween. That is, the upper ends 31a are disposed to be positioned immediately below one the winding wires 13a to 13e (to be overlapped with the winding wires 13a to 13e in projection in a coil axial direction) that form at least the corner sections C of the coil 11. Particularly in this embodiment, at least part of the upper ends 31a of the support member 31 is disposed to be overlapped with the outermost circumferential winding wire 13e that forms the corner sections C in a coil axial direction view.

Also, the upper surface of the upper ends 31a is approximately flush with the upper surface of the ferrite tiles 29 disposed immediately below the winding wires 13a to 13e forming the non-corner sections NC, and is in contact with the lower surface (inner surface) of the lid 27 of the core case 23. Also, a lateral surface of the upper ends 31a is in contact with a lateral surface of the ferrite tiles 29 in the core case 23.

Heat can be transferred between the support members 31 and the coil 11 via a contact surface between the lid 27 of the core case 23 and the winding wire 13, via a contact surface between the lid 27 and the upper ends 31a of the support members 31, and via the lid 27. Also, heat can be transferred between the support members 31 and the ferrite core 21 via a contact surface between the upper ends 31a of the support members 31 and the ferrite tiles 29. Therefore, heat generated in the coil section 10 and the core section 20 is dissipated to the outside (such as the ground) via the support members 31 and the base plate 33. Each support members 31 is made of aluminum and has a higher thermal conductivity than the ferrite tiles 29, in short, the ferrite core 21, and thus serves as an excellent thermal conductor. Also, the lower surface of the base plate 33 is in contact with the ground at a large area, and thus serves as an excellent heat dissipation surface.

Hereinafter, the operational effects in this embodiment will be described.

Figure 2:
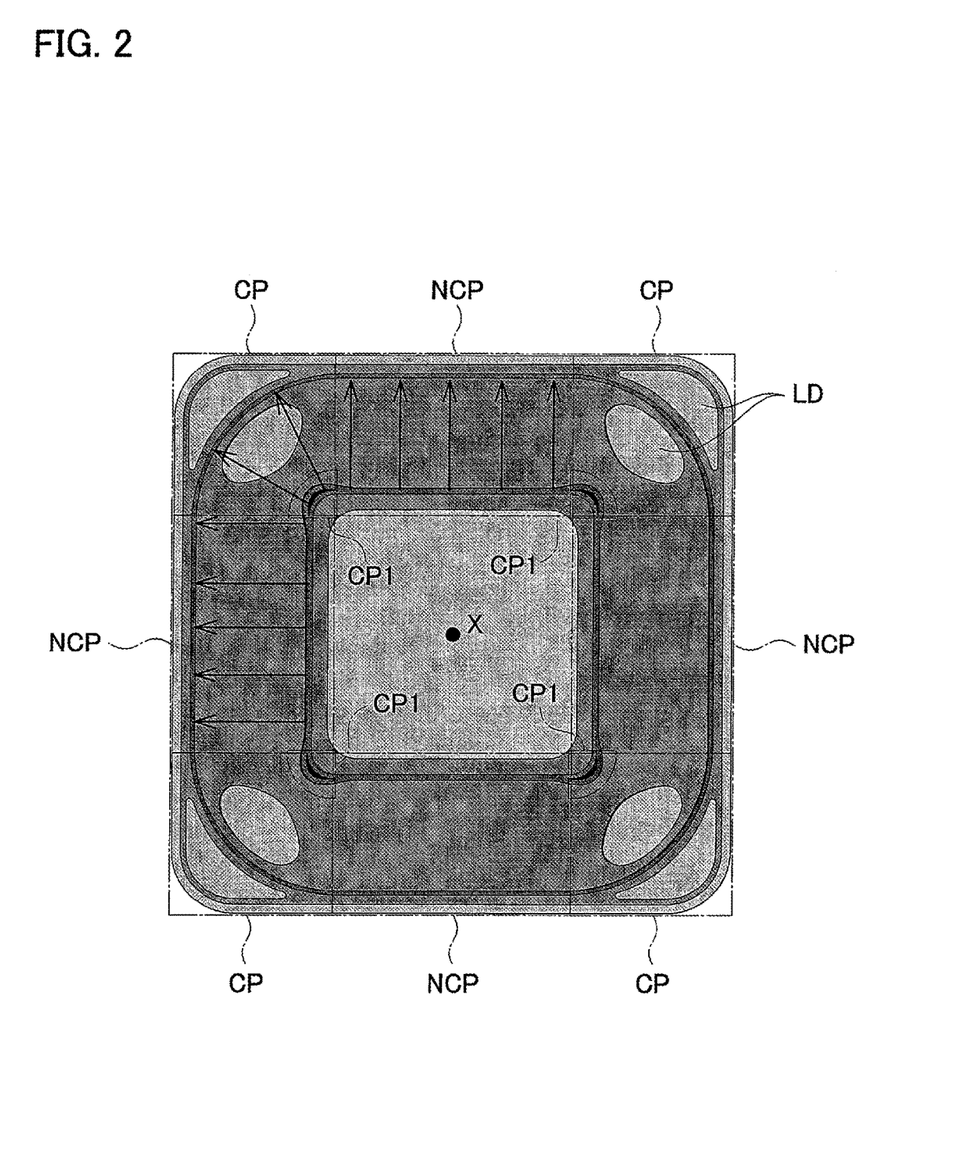
FIG. 2 is a diagram illustrating a magnetic flux density distribution of a coil in a vicinity area in a coil axial direction during a contactless power supply operation.

When high frequency power for contactless power supply is supplied to the coil unit U1 according to this embodiment, the magnetic flux density distribution in a peripheral area of the coil 11 becomes non-uniform. FIG. 2 illustrates a magnetic flux density distribution and images (arrows) of typical lines of magnetic force in a vicinity area (the lower surface level of the coil 11) in a coil axial direction of the coil 11. It is to be noted that in FIG. 2, the darker the color of an area, the higher the magnetic flux density. As indicated by arrows in FIG. 2, in the areas corresponding to the corner sections C of the coil 11, the number of lines of magnetic force per unit volume of the ferrite core 21 is smaller at a more outer position (at a position more separated from the coil axis X). Therefore, a low magnetic flux density area (for instance, an area LD) is likely to occur in corner section vicinity areas CP than in non-corner section vicinity areas NCP. Also, the winding wire 13 generates heat due to its resistance loss (copper loss) during a contactless power supply operation, thus the temperature of the coil 11 increases.

In the coil unit U1 according to this embodiment, each support member 31 is disposed to face a corner section C of the coil 11, and thus the support member 31 which is a thermal conductor can be in close proximity to the winding wire 13 which is a heating element while suppressing the effect on the amount of magnetic flux passing through the ferrite core 21. Also, since the support member 31 has a higher thermal conductivity than the ferrite core 21, the heat of the winding wire 13 can be introduced to the outside efficiently. Thus, the heat dissipation performance of the coil unit U1 can be improved while suppressing degradation of the electromagnetic performance of the coil 11.

As illustrated in FIG. 2, the magnetic flux density distribution in a peripheral area of the coil 11 tends to be lower at a portion more outwardly of the areas corresponding to the corner sections C of the coil 11. In this embodiment, at least part of the support members 31 is disposed to be overlapped with the outermost circumferential winding wire 13e in a coil axial direction view. Consequently, the support members 31 are disposed in an area having a lower magnetic flux density, and thus it is possible to suppress degradation of the electromagnetic performance of the coil 11 more reliably.

Furthermore, in this embodiment, the ferrite tiles 29 at the positions corresponding to the corner sections C of the coil 11 are replaced by the aluminum support members 31 that have a higher thermal conductivity than the ferrite core 21. For this reason, the heat dissipation performance is improved because the heat resistance decreases on the way from the winding wire 13 of the coil 11 to a heat dissipation surface, as compared with the case where the ferrite tiles 29 are left at the above-mentioned positions.

Also, since the support members 31 are made of aluminum in this embodiment, the heat dissipation performance is improved because the heat resistance decreases on the way from the winding wire 13 of the coil 11 to a heat dissipation surface, as compared with the case where the support members 31 are made of, for instance, resin. Particularly in this embodiment, the support members 31 are connected to the base plate 33 fastened to the ground in a heat transferable manner, and thus the heat of the winding wire 13 can be efficiently dissipated via the base plate 33.

Also, since the winding wire 13 of the coil 11 is wound in a rectangular spiral form in this embodiment, a larger coil area for each turn (area surrounded by the winding wire 13) can be provided in a rectangular area where vertical and horizontal dimensions are restricted in a plan view, and thus the inductance of the coil 11 can be increased.

Furthermore, since the 4 non-corner sections NC are approximately linear in the coil 11 of this embodiment, it is possible to provide a large difference between the curvature of the innermost circumferential winding wire 13a and the curvature average value of the winding wire 13a at each corner section C. Therefore, the tendency of relative decrease in magnetic flux density is more obvious in the corner section vicinity areas CP. Consequently, it is possible to suppress the effect made on the electromagnetic performance of the coil 11 by the support members 31 disposed to face the corner sections C.

Second Embodiment

Next, a coil unit U2 for contactless power supply according to a second embodiment of the present invention will be described with reference to FIG. 3. It is to be noted that any component having the same function as the function of a component already described above is labeled with the same symbol, and a description is omitted.

The coil unit U2 differs from the coil unit U1 according to the first embodiment in that an upper end 31Aa of a support member 31A (thermal conductor) is positioned outwardly of the innermost circumferential winding wire 13a in a coil axial direction view.

Figure 3:
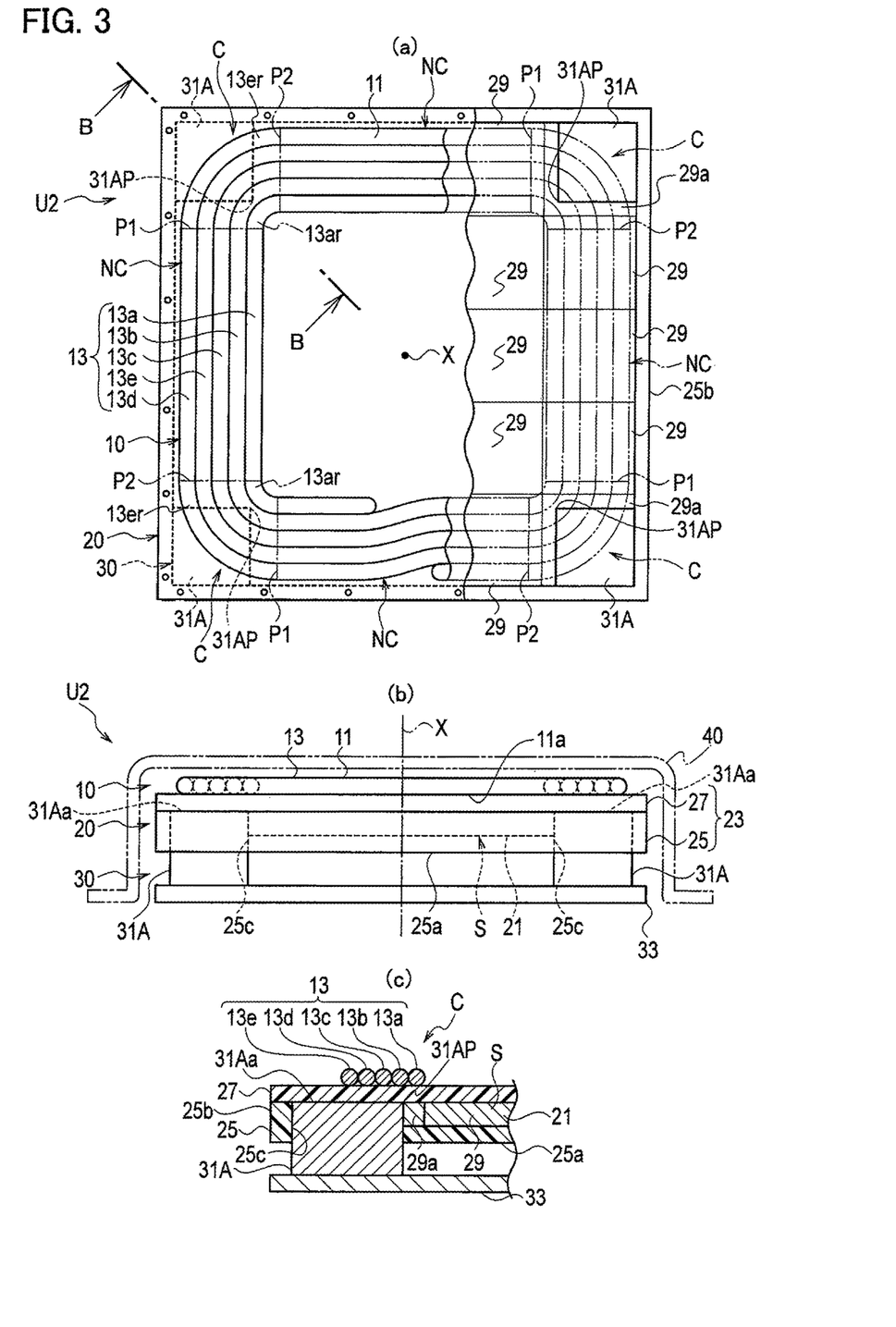
FIG. 3 is a diagram illustrating the structure of a coil unit for contactless power supply according to a second embodiment of the present invention, (a) is a plan view, (b) is a side view, and (c) is a sectional view taken along line B-B in (a).

As illustrated in (a) to (c) of FIG. 3, like the support members 31 in the first embodiment, the support members 31A in this embodiment are provided at the four corners of the core section 20. The support members 31A each have a prism-like shape, and the upper ends 31Aa thereof are inserted in the openings 25c provided at the four corners of the bottom plate 25a of the tray 25 of the core case 23. The upper ends 31Aa face the corner sections C of the coil 11 in a coil axial direction with the lid 27 of the core case 23 interposed therebetween.

In this embodiment, the upper ends 31Aa of the support members 31A are disposed to be positioned immediately below the outermost circumferential winding wire 13e (to be overlapped with the winding wire 13e in projection in a coil axial direction) that form at least the corner sections C of the coil 11. In addition, the upper ends 31Aa are positioned outwardly of the innermost circumferential winding wire 13a of the coil 11 in a coil axial direction view. Specifically, innermost ends 31AP of the upper ends 31Aa are positioned outwardly in a coil axial direction view of the innermost circumferential winding wire 13a that forms the corner sections C of the coil 11. Thus, the upper ends 31Aa of the support members 31A are not positioned immediately below the innermost circumferential winding wire 13a (not overlapped with the winding wire 13a in projection in a coil axial direction), and the support members 31A are not present in portions CP1 (see FIG. 2) inwardly (closer to the coil axis X) of the corner section vicinity areas CP. In instead of the support members 31A, ferrite tiles 29a are disposed in the portions CP1.

With the coil unit U2 for contactless power supply according to this embodiment, the following effect can be obtained in addition to the same effect of the first embodiment.

As illustrated in FIG. 2, in the portions CP1 inwardly of the corner section vicinity areas CP, an area with a locally high magnetic flux density is likely to be formed. Since the support members 31A are positioned outwardly of the innermost circumferential winding wire 13a in a coil axial direction view in this embodiment, the ferrite core 21 can be disposed in high magnetic flux density areas which are formed in the portions CP1 inwardly of the corner section vicinity areas CP. Consequently, it is possible to further suppress degradation of the electromagnetic performance of the coil 11.

Third Embodiment

Next, a coil unit U3 for contactless power supply according to a third embodiment of the present invention will be described with reference to FIG. 4. It is to be noted that any component having the same function as the function of a component already described above is labeled with the same symbol, and a description is omitted.

The coil unit U3 differs from the coil units U1, U2 according to the first and second embodiments mainly in the following two points. Specifically, the first point is that multiple first support members 31B are disposed to face one non-corner section NC, and second ferrite tiles 29d (magnetic material core members) extending from the inside to the outside of the coil 11 are disposed between these first support members 31B. The second point is that multiple second support members 31C (thermal conductors) are disposed to face one corner section C, and third ferrite tiles 29e (magnetic material members) extending from the inside to the outside of the coil 11 are disposed between these second support members 31C.

Figure 4:
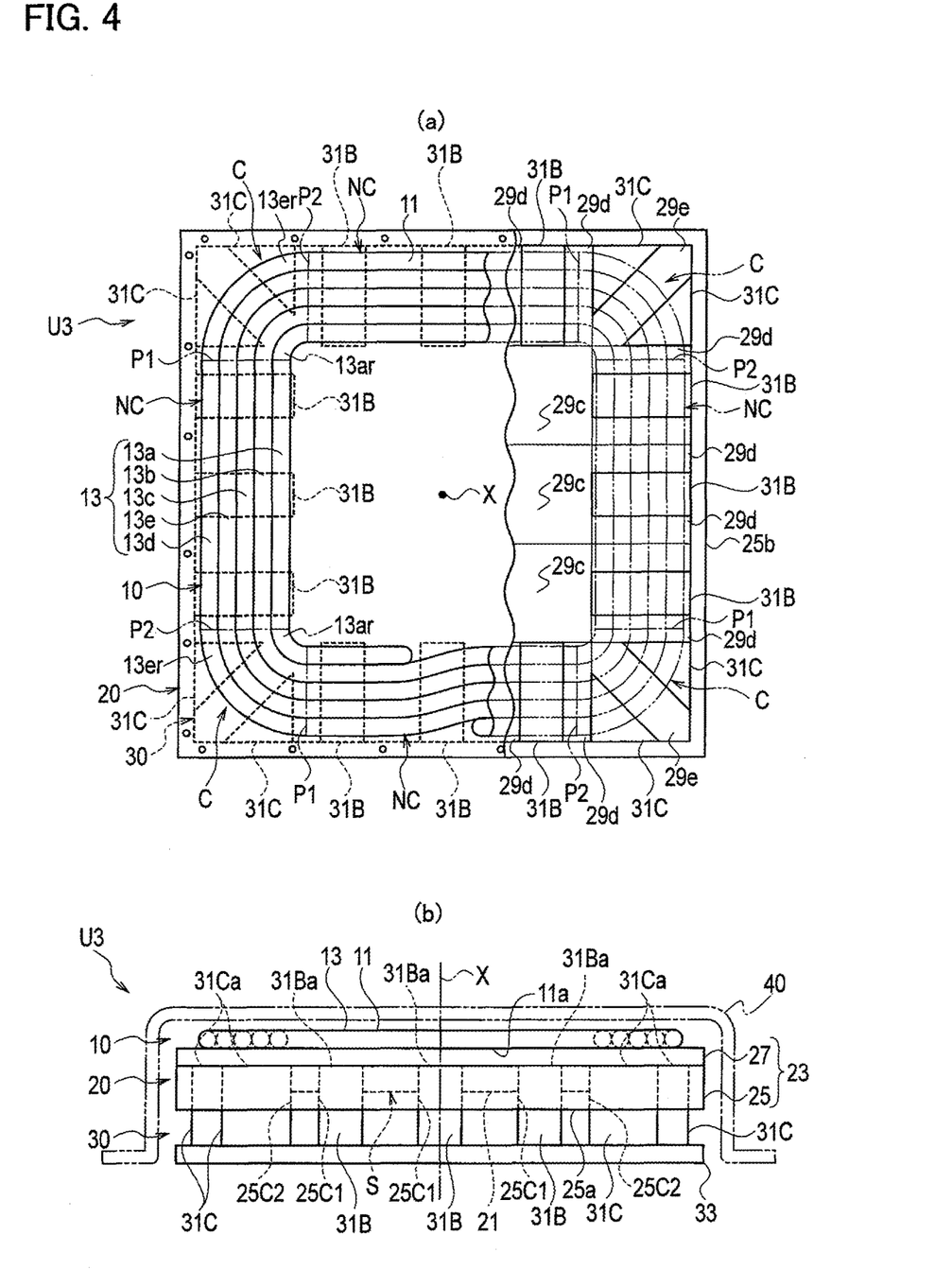
FIG. 4 is a diagram illustrating the structure of a coil unit for contactless power supply according to a third embodiment of the present invention, (a) is a plan view, and (b) is a side view.

As illustrated in (a) and (b) of FIG. 4, the ferrite core 21 in this embodiment includes multiple first ferrite tiles 29c with which the housing space S of the core case 23 is covered, the second ferrite tiles 29d, and the third ferrite tiles 29e.

The first ferrite tiles 29c each have a rectangular parallelepiped shape with the approximately square bottom surface, and a rectangular area inwardly of the innermost circumferential winding wire 13a in a coil axial direction view is fully covered with the first ferrite tiles 29c.

The second ferrite tiles 29d are disposed at predetermined intervals in the extending direction of each non-corner section NC of the coil 11 so as to be positioned immediately below the winding wire 13 (be overlapped with the winding wire 13 in projection in a coil axial direction) that forms the non-corner sections NC of the coil 11. The second ferrite tiles 29d each have a rectangular parallelepiped shape with the approximately rectangular bottom surface, and are disposed so as to cross the winding wire 13 that forms the non-corner sections NC, in a coil axial direction view. Specifically, the inner side end, closer to the coil axis X, of each second ferrite tile 29d is in contact with one of the first ferrite tiles 29c, and a magnetic path extending from the inside to the outside of a non-corner section NC in a coil axial direction view is formed.

The third ferrite tiles 29e are disposed so as to be positioned immediately below the winding wire 13 (be overlapped with the winding wire 13 in projection in a coil axial direction) that forms the corner sections C of the coil 11. The third ferrite tiles 29e each have a hexagonal prism shape with the elongated hexagonal bottom surface, and are disposed so as to cross the winding wire 13 that forms the corner sections C in a coil axial direction view, or to extend along the curvature radius direction of the winding wire 13 that forms the corner sections C. The inner side end, closer to the coil axis X, of each third ferrite tile 29e is in contact with the first or second ferrite tile 29c, 29d, and a magnetic path extending radially from the inside to the outside of a corner section C in a coil axial direction view is formed. On both sides of each third ferrite tile 29e, triangular spaces between the third ferrite tile 29e and the two closest second ferrite tiles 29d in a coil axial direction view are formed.

The upper surface of each third ferrite tile 29e is at a position facing a corner section C of the coil 11 in a coil axial direction with the lid 27 of the core case 23 interposed therebetween. In addition, the upper surface of each second ferrite tile 29d is at a position facing a non-corner section NC of the coil 11 in a coil axial direction with the lid 27 of the core case 23 interposed therebetween.

In the bottom plate 25a of the tray 25 of the core case 23, openings 25c1, 25c2 are provided at positions corresponding to the above-mentioned spaces that are formed between the second ferrite tiles 29d and between the second ferrite tile 29d and the third ferrite tile 29e. The later-described upper ends 31Ba of the first support members 31B are each inserted in the first opening 25c1 corresponding to a space between the second ferrite tiles 29d. Also, the later-described upper ends 31Ca of the second support member 31C are each inserted in the opening 25c2 corresponding to a space between the second ferrite tile 29d and the third ferrite tile 29e.

As illustrated in (a) and (b) of FIG. 4, the support section 30 includes multiple aluminum first support members 31B and second support members 31C, and the base plate 33 connected to the lower ends of the first and second support members 31B, 31C in a heat transferable manner.

Each side of the core section 20 is provided with 3 sets of the first support member 31B, and the core section 20 is provided with totally 12 sets of the first support member 31B. Each first support member 31B has a quadrangular prism shape, and the upper end 31Ba thereof is inserted in a first opening 25c1 of the tray 25.

The upper end 31Ba of each first support member 31B faces a non-corner section NC of the coil 11 in a coil axial direction with the lid 27 of the core case 23 interposed therebetween, and is disposed so as to be positioned immediately below the winding wire 13 (be overlapped with the winding wire 13 in projection in a coil axial direction) that forms at least the non-corner sections NC. Also, the upper surface of the upper end 31Ba is approximately flush with the upper surface of the second ferrite tiles 29d, and is in contact with the lower surface (inner surface) of the lid 27 of the core case 23. In addition, a lateral surface of the upper end 31Ba is in contact with lateral surfaces of the first and second ferrite tiles 29c, 29d.

Meanwhile, each of the four corners of the core section 20 is provided with 2 sets of the second support member 31C. Each second support member 31C has a triangular prism shape, and the upper end 31Ca is inserted in a second opening 25c2 of the tray 25.

The upper end 31Ca of each second support member 31C faces a corner section C of the coil 11 in a coil axial direction with the lid 27 of the core case 23 interposed therebetween, and is disposed so as to be positioned immediately below the outermost circumferential winding wire 13e (be overlapped with the winding wire 13e in projection in a coil axial direction) that forms at least the corner sections C. Also, the upper surface of the upper end 31Ca is approximately flush with the upper surfaces of the second and third ferrite tiles 29d, 29e, and is in contact with the lower surface (inner surface) of the lid 27 of the core case 23. In addition, a lateral surface of the upper end 31Ca is in contact with lateral surfaces of the second and third ferrite tiles 29d, 29e.

Also, heat can be transferred between the first and second support members 31B, 31C and the coil 11 via a contact surface between the lid 27 of the core case 23 and the winding wire 13, a contact surface between the lid 27 and the upper ends 31Ba, 31Ca of the first and second support members 31B, 31C, and via the lid 27. Also, heat can be transferred between the first support members 31B and the ferrite core 21 via a contact surface between the upper ends 31Ba of the first support members 31B and the first and second ferrite tiles 29c, 29d. In addition, heat can be transferred between the second support members 31C and the ferrite core 21 via a contact surface between the upper ends 31Ca of the second support members 31C and the second and third ferrite tiles 29d, 29e. Therefore, heat generated in the coil section 10 and the core section 20 is dissipated to the outside (such as the ground) via the first and second support members 31B, 31C and the base plate 33.

With the coil unit U3 for contactless power supply according to this embodiment, the following effect can be obtained in addition to the same effect of the first and second embodiments.

In this embodiment, multiple second support members 31C are disposed to face a corner section C of the coil 11, and the third ferrite tile 29e extending from the inside to the outside of the coil 11 is disposed between those second support members 31C. Therefore, in an area corresponding to each corner section C, a magnetic path along the flow of magnetic flux can be formed with less magnetic materials, and a large range of the second support member 31C which is a good thermal conductor can be provided. Thus, the heat dissipation performance of the coil unit U3 can be improved while suppressing degradation of the electromagnetic performance of the coil 11.

Also, in this embodiment, multiple first support members 31B are disposed to face a non-corner section NC of the coil 11, and the second ferrite tile 29d extending from the inside to the outside of the coil 11 is disposed between those first support members 31B. Therefore, in an area corresponding to each non-corner section NC, a magnetic path along the flow of magnetic flux can be formed with less magnetic materials, and a large range of the first support member 31B which is a good thermal conductor can be provided.

<Corner Section C and Non-Corner Section NC>

The corner sections C of the flat coil 11 may take various forms according to an inductance required for the coil and an acceptable curvature (a minimum bending radius) of the winding wire 13. For instance, as illustrated in (a) of FIG. 5, the area surrounded by the winding wire 13 may be maximized for each turn by bending all winding wires 13 from the innermost to the outermost with a minimum bending radius in the predetermined corner areas. In this case, each corner section C includes a local maximum curvature section 13ar of the innermost circumferential winding wire 13a, and a portion that is positioned between one side boundary surface P1 and the other side boundary surface P2 and is outwardly of the local maximum curvature section 13ar in the other winding wires 13b to 13e. The corner section C includes a local maximum curvature section 13er of the outermost circumferential winding wire 13e. Also, each non-corner section NC is a portion that is interposed by the boundary surfaces P1, P2 between adjacent corner sections C, and is formed of an approximately linear winding wire 13 in the coil 11 in (a) of FIG. 5.

Figure 5:
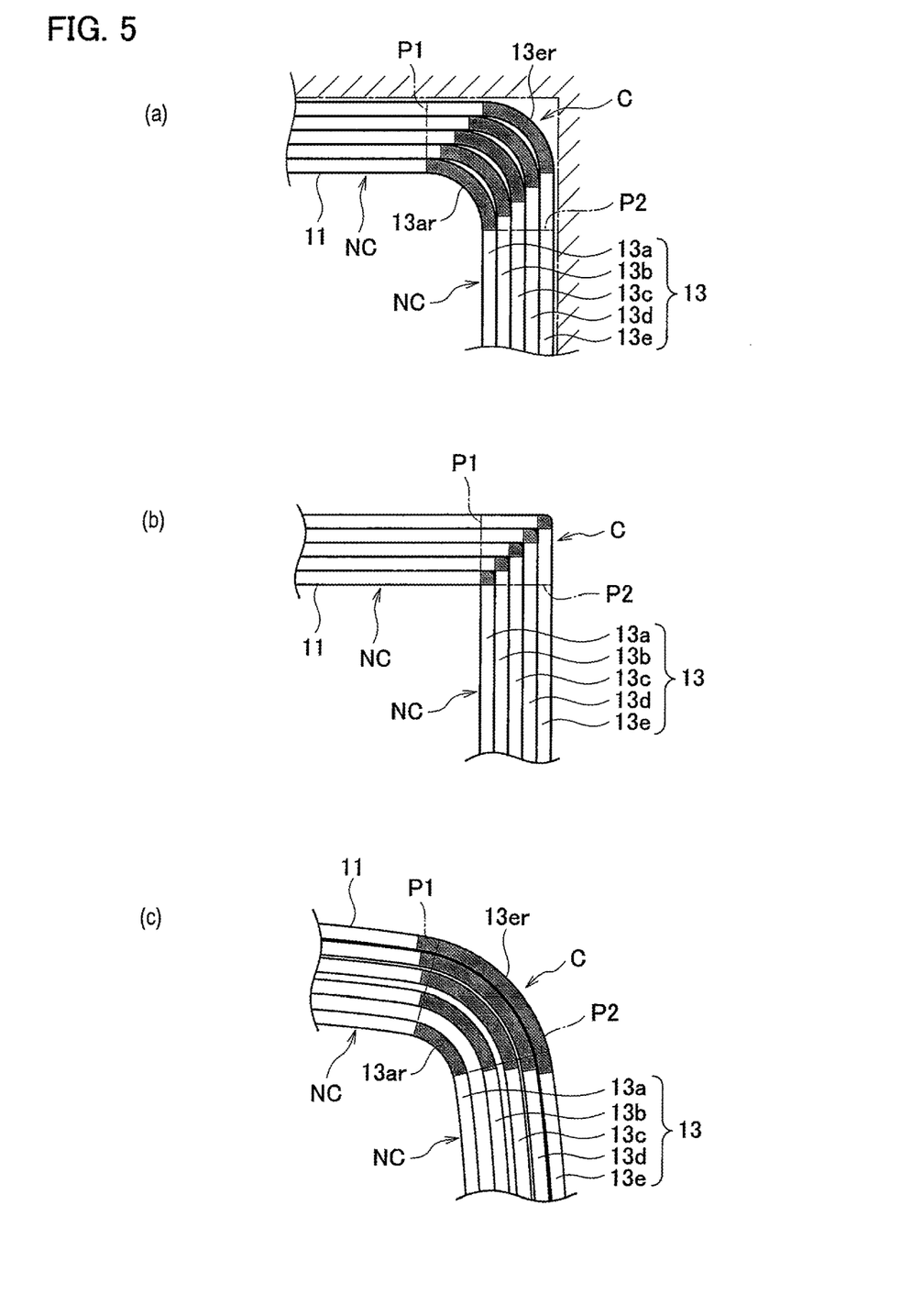
FIG. 5 is a diagram illustrating an example of a corner section and a non-corner section of a coil.

Also, when the winding wire 13 is bendable, as illustrated in (b) of FIG. 5, the corner section C includes a portion positioned between one side boundary surface P1 and the other side boundary surface P2 that pass through a bending point of the innermost circumferential winding wire 13a. Also, like the coil 11 in (a) of FIG. 5, the non-corner section NC includes a portion that is interposed by the boundary surfaces P1, P2 between adjacent corner sections C, and is formed of an approximately linear winding wire 13.

Also, as illustrated in (c) of FIG. 5, the winding wire 13 forming the non-corner section NC of the coil 11 may be slightly bent in order to suppress the effects such as vibration or thermal expansion at the time of energization. Even in this case, each corner section C includes the local maximum curvature section 13ar of the innermost circumferential winding wire 13a, and a portion that is positioned between one side boundary surface P1 and the other side boundary surface P2 and is outwardly of the local maximum curvature section 13ar in the other winding wires 13b to 13e. The corner section C includes part of the local maximum curvature section 13er of the outermost circumferential winding wire 13e. It is to be noted that each portion colored in gray in (a) to (c) of FIG. 5 corresponds to the local maximum curvature section of each winding wire.

In addition, when the minimum bending radius of a winding wire is large or the number of turns of a winding wire is high, the innermost circumferential winding wire may be circular in a coil axial direction view. In this case, one of the winding wires other than the circular winding wire, and the one not circular and is positioned in the innermost in a coil axial direction view is regarded as the innermost circumferential winding wire, and the corner section C and the non-corner section NC may be defined.

Although the embodiments of the present invention have been described above, those embodiments are merely illustrations for facilitating the understanding of the present invention, and the present invention is not limited to those embodiments. The technical scope of the present invention includes not only specific technical matters disclosed in the above-mentioned embodiments, but also various modifications, changes, alternative techniques that may be easily derived from the technical matters.

For instance, although the coil units U1, U2, U3 in the above-mentioned embodiments are coil units for power supply, the present invention is also applicable to a coil unit for power reception mounted in an electric vehicle. For instance, the coil unit for power reception can be constituted by a coil section, a core section provided above the coil section, and a support section that supports the coil section and the core section by the lower surface of a vehicle body. The support section can be constituted by a support member inserted into a core case (thermal conductor), and an aluminum magnetic shield, connected to the support member and fastened to the lower surface of a vehicle body. In the coil unit, heat generated in the coil section and the core section is dissipated to the outside (such as air in the surroundings of the magnetic shield) via the support member and the magnetic shield.

Also, in the above-mentioned embodiments, aluminum thermal conductors are adopted as the support members 31, 31A, 31B, 31C. However, the material of the support member is not particularly limited, and a member having a higher thermal conductivity than the ferrite core 21 can be adopted. From the viewpoint of suppressing heat generation at the time of energization, it is desirable that the member have low hysteresis loss and Eddy current loss. However, it is not necessary that the member is necessarily a non-magnetic material. It is to be noted that an aluminum material is most suitable from the aspect of cost.

Furthermore, although the coil 11 of the above-mentioned embodiments has an approximately rectangular annular shape in a coil axial direction view, the shape of the coil is not particularly limited, and the present invention is applicable when the shape is non-circular. Examples of non-circular shape include a sector shape, a semi-circular shape, and a polygonal shape. In a polygonal coil, a corner section C is formed in each portion corresponding to a vertex, and a non-corner section NC is formed in each portion corresponding to a side. In a sector-shaped coil, a corner section C is formed in each portion corresponding to an intersection point between a radius and an arc, the central angle, and a non-corner section NC is formed in each portion corresponding to a radius, an arc. In a semi-circular coil, a corner section C is formed in each portion corresponding to both ends of a chord, and a non-corner section NC is formed in each portion corresponding to a chord, an arc. Therefore, the magnetic flux density distribution in a peripheral area of a non-circular coil becomes non-uniform, and like the case of the rectangular annular coil, an area having a lower magnetic flux density is likely to occur in a corner section vicinity area. Consequently, even in these coils, the thermal conductor is disposed to face a corner section C, and thus the thermal conductor can be disposed in close proximity to the winding wire which is a heating element, while suppressing the effect on the amount of magnetic flux passing through the core member.

Although the coil section 10 has the single coil 11 in the above-mentioned embodiments, the coil section may include two or more coils disposed side by side in the perpendicular direction (horizontal direction) to the coil axis. Although the wire of the coil 11 in the above-mentioned embodiments is wound 5 turns from the innermost to the outermost, the number of winding is not particularly limited, and may be less than 5 turns or more than 5 turns.

Furthermore, in the above-mentioned embodiments, the winding wire 13 of the coil 11 is wound from the innermost to the outermost without being overlapped in a coil axial direction. However, in part or all of the coil, the winding wire may be wound with two turns overlapped in a coil axial direction.

Also, in the above-mentioned embodiments, the electrical insulation performance is ensured by interposing the lid 27 of the core case 23 between the upper ends 31a, 31Aa, 31Ba, 31Ca of the support members 31, 31A, 31B, 31C, and the coil 11. However, as long as sufficient insulation performance can be ensured by covering the winding wire 13 itself with an insulation layer, the upper surfaces of the support members 31, 31A, 31B, 31C may be in direct contact with the winding wire 13. This causes the heat dissipation performance to be further improved.

Furthermore, in the above-mentioned embodiments, the ferrite tiles 29 facing the corner sections C of the coil 11 are replaced by the support members 31, 31A, 31C, which are thereby in close proximity to the coil 11. However, the support members 31, 31A, 31C may be disposed in close proximity to the coil by reducing the thickness of the ferrite tile 29 (reducing the height in a coil axial direction).

INDUSTRIAL APPLICABILITY

According to the present invention, a coil unit for contactless power transmission can be provided.

REFERENCE SIGNS LIST

U1, U2, U3 coil unit for contactless power supply
11 coil (flat coil)
C corner section
NC non-corner section
13, 13a, 13b, 13c, 13d, 13e winding wire
21 ferrite core (magnetic material core member)
29 ferrite tile (magnetic material core member)
29d second ferrite tile (magnetic material core member)
29e third ferrite tile (magnetic material member)
31 support member (thermal conductor)
31A support member (thermal conductor)
31C second support member (thermal conductor)

The invention claimed is:

1. A coil unit for contactless power transmission comprising:
    a non-circular flat coil that has a plurality of corner sections corresponding to corners of the flat coil and a non-corner section, in a coil axial direction view;
    a core member made of a magnetic material disposed to overlap the non-corner section of the flat coil in a coil axial direction; and
    a thermal conductor that is disposed to overlap the corner sections of the flat coil in the coil axial direction, and that has a higher thermal conductivity than the core member.

2. The coil unit for contactless power transmission according to claim 1, wherein at least part of the thermal conductor is disposed to be overlapped with an outermost circumferential winding wire in the coil axial direction view.

3. The coil unit for contactless power transmission according to claim 1, wherein the thermal conductor is positioned outwardly of an innermost circumferential winding wire in the coil axial direction view.

4. The coil unit for contactless power transmission according to claim 1, wherein a plurality of pieces of the thermal conductor are disposed to overlap one corner section of the flat coil, and a magnetic material member extending from an inner side of the flat coil to an outer side of the flat coil is disposed between the plurality of pieces of the thermal conductor.

5. The coil unit for contactless power transmission according to claim 1, wherein the non-corner section of the flat coil is free of the thermal conductor.

* * * * *